(12) United States Patent
Li et al.

(10) Patent No.: US 8,474,997 B2
(45) Date of Patent: Jul. 2, 2013

(54) HIGH BRIGHTNESS ILLUMINATION DEVICE USING DOUBLE-SIDED EXCITATION OF WAVELENGTH CONVERSION MATERIALS

(75) Inventors: Yi Li, Pleasanton, CA (US); Yi Yang, Shen Zhen (CN); Fei Hu, Shen Zhen (CN)

(73) Assignee: Appotronics Corporation Limited, Guangdong (CN)

( * ) Notice: Subject to any disclaimer, the term of this patent is extended or adjusted under 35 U.S.C. 154(b) by 285 days.

(21) Appl. No.: 13/081,931

(22) Filed: Apr. 7, 2011

(65) Prior Publication Data

US 2011/0249436 A1    Oct. 13, 2011

(30) Foreign Application Priority Data

Apr. 7, 2010  (CN) .......................... 2010 1 0149135

(51) Int. Cl.
   *F21V 13/00* (2006.01)
(52) U.S. Cl.
   USPC ............ 362/243; 362/242; 362/235; 362/236
(58) Field of Classification Search
   USPC .................................. 362/243, 242, 235, 236
   See application file for complete search history.

(56) References Cited

U.S. PATENT DOCUMENTS

| | | | |
|---|---|---|---|
| 5,537,229 A * | 7/1996 | Brandestini et al. .......... 358/509 |
| 7,445,340 B2 * | 11/2008 | Conner et al. ................. 353/20 |
| 7,547,114 B2 | 6/2009 | Li et al. | |
| 7,821,713 B2 * | 10/2010 | Magarill et al. ......... 359/489.08 |
| 2005/0270775 A1 * | 12/2005 | Harbers et al. ................ 362/231 |
| 2006/0262514 A1 * | 11/2006 | Conner et al. .................. 362/19 |
| 2008/0158873 A1 * | 7/2008 | Bierhuizen et al. ........... 362/230 |
| 2008/0310845 A1 | 12/2008 | Xu | |
| 2009/0034284 A1 * | 2/2009 | Li et al. ......................... 362/554 |
| 2010/0046234 A1 | 2/2010 | Abu-Ageel | |

OTHER PUBLICATIONS

International Search Report and Written Opinion in counterpart PCT application No. PCT/US2011/031582, dated Jun. 22, 2011.

* cited by examiner

*Primary Examiner* — Mary Ellen Bowman
(74) *Attorney, Agent, or Firm* — Chen Yoshimura LLP

(57) ABSTRACT

An illumination devices using excitation light and a wavelength conversion material to generated converted light for illumination, where the wavelength conversion material is excited by multiple excitation lights from both sides to achieve increased brightness. The excitation lights incident on the two sides of the wavelength conversion material may have the same color or different colors. Light separation structures are provided on both sides of the wavelength conversion material to separate the excitation light and the converted light. Light separation may be based on color difference or etendue difference of the excitation light and converted light. In one particular example, wavelength conversion material is formed on a surface of an LED which acts as the first excitation light source, and a second excitation light is delivered through a light separation structure onto the other side of the wavelength conversion material.

29 Claims, 3 Drawing Sheets

HIGH BRIGHTNESS ILLUMINATION DEVICE USING DOUBLE-SIDED EXCITATION OF WAVELENGTH CONVERSION MATERIALS

This application claims priority under 35 USC §119(a)-(d) from Chinese patent application No. 201010149135.6, filed Apr. 7, 2010, which is incorporated by reference in its entirety. In addition, it is related to Chinese patent application No. 201010624857.2, filed Jan. 21, 2011, which is incorporated by reference in its entirety.

BACKGROUND OF THE INVENTION

1. Field of the Invention

This invention relates to a wavelength conversion-based illumination devices, and in particular, it relates to such illumination devices which use multiple excitation light sources to excite a wavelength conversion material to increase brightness of the illumination device.

2. Description of the Related Art

To achieve high brightness, low cost color illumination devices, technologies that use excitation light and wavelength conversion materials are widely used. In such an illumination device, short wavelength light (e.g. blue or UV light) from excitation light sources such as semiconductor lasers or light emitting diodes (LED) are absorbed by the wavelength conversion materials such as phosphors and converted to different wavelength lights. To increase the brightness (i.e. power density) of the illumination device, techniques are developed to increase the efficiency of light conversion by the wavelength conversion materials and the efficiency of light extraction from the wavelength conversion materials.

In one example, to increase light extraction from the wavelength conversion material, the wavelength conversion may be placed in a reflective cavity, and excitation light sources are located on the surfaces of the cavity. The output orifice of the cavity is smaller than the area of the wavelength conversion material, so that the low brightness light generated y by the wavelength conversion material is concentrated by the reflective cavity to obtain a brighter output light. A shortcoming of this technique is that, because the reflectivity of the cavity surface is less than 100%, multiple reflections within the cavity causes significant loss of light, which lowers the efficiency of the illumination device. In addition, when such a device is used for high power illumination devices, the power density generated by the wavelength conversion material is high, so that heat dissipation may become a problem. It has been shown that the light emission efficiency of phosphors decreases with temperature. For example, for a green phosphor material, the light emission efficiency drops significantly when the temperature reaches a certain level such as 130 degrees C. Thus, this type of design has limited efficiency for high power illumination devices.

SUMMARY OF THE INVENTION

Accordingly, the present invention is directed to an illumination device using excitation light sources and wavelength conversion materials that substantially obviates one or more of the problems due to limitations and disadvantages of the related art.

An object of the present invention is to provide such an illumination device with increased brightness.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an illumination device which includes: a first excitation light source generating a first excitation light, the first excitation light source having a light emitting surface from which the first excitation light exits; a wavelength conversion material formed on the light emitting surface of the first excitation light source; a second excitation light source structure generating a second excitation light incident on the wavelength conversion material from a second side which is opposite the first excitation light source; wherein the wavelength conversion material absorbs the first and second excitation lights and generates a converted light having different wavelengths than the first and second excitation lights; wherein the first excitation light source has a highly reflective layer on a surface opposite the light emitting surface which reflects the first excitation light and the converted light; and a light separation structure disposed between the wavelength conversion material and the second excitation light source to separate the converted light and the second excitation light. The first and second excitation lights structure may have the same color or different colors.

In another aspect, the present invention provides an illumination device which includes: a wavelength conversion material; a first excitation light source structure generating a first excitation light incident on the wavelength conversion material from a first side; a second excitation light source structure generating a second excitation light incident on the wavelength conversion material from a second side, wherein the first and second excitation lights have the same color; wherein the wavelength conversion material absorbs the first and second excitation lights and generates a converted light having different wavelengths than the first and second excitation lights; a first light separation structure disposed on the first side of the wavelength conversion material to separate the converted light and the first excitation light; and a second light separation structure disposed on the second side of the wavelength conversion material to separate the converted light and the second excitation light. The light separation structures separate the excitation lights and the converted light based on their color difference, etendue difference, or other properties of the light such as polarization.

In another aspect, the present invention provides an illumination device which includes: a wavelength conversion material; a first excitation light source structure generating a first excitation light incident on the wavelength conversion material from a first side; a second excitation light source structure generating a second excitation light incident on the wavelength conversion material from a second side; wherein the wavelength conversion material absorbs the first and second excitation lights and generates a converted light having different wavelengths than the first and second excitation lights; a first light separation structure disposed on the first side of the wavelength conversion material to separate the converted light and the first excitation light; and a second light separation structure disposed on the second side of the wavelength conversion material to separate the converted light and the second excitation light based on an etendue difference between the converted light and the second excitation light. The first and second excitation lights may have the same color or different colors.

It is to be understood that both the foregoing general description and the following detailed description are exemplary and explanatory and are intended to provide further explanation of the invention as claimed.

DETAILED DESCRIPTION OF THE PREFERRED EMBODIMENTS

In illumination devices using excitation light and wavelength conversion materials, the output brightness (i.e. light power density, or light power per unit area) is typically not limited by the light emission capacity of the wavelength conversion material. Thus, increasing the intensity of the excitation light will typically increase the brightness of the emitted light from the wavelength conversion material. Embodiments of the present invention provide illumination devices which employs multiple excitation light sources to illuminate the wavelength conversion material from both sides to achieve increased brightness.

U.S. Pat. No. 7547114, issued Jun. 16, 2009, describes an illumination device using a multi-segmented moving plate with multiple wavelength conversion materials to provide multi-colored lights. One embodiment, shown in FIG. 15a of this patent, described a configuration where the moving plate bearing the wavelength conversion material is illuminated from both sides by two excitation light sources that have different colors.

Embodiments of the present invention provide several illumination devices using double-sided excitation of the wavelength conversion material. In a first embodiment, a wavelength conversion material is coated on the top surface of a first excitation light source such as an LED (light emitting diode), and a second excitation light is provide above the wavelength conversion material. The converted light is emitted and extracted from above the wavelength conversion material, and is separated from the second excitation light using a light separation structure.

In a second embodiment, the wavelength conversion material is carried by a substrate and two (or more) excitation lights having the same color are provided on both sides of the substrate, with light separation structures provided on both sides of the wavelength conversion material to separate the excitation light and the converted light. In this disclosure, two excitation lights are considered to have the same color if their spectra substantially overlap, as will be discussed in more detail later. In this embodiment, the wavelength conversion material may be moving or non-moving (stationary); the light separation structures separate the excitation lights and the converted light based on their color difference, etendue difference, or other properties of the light such as polarization.

In a third embodiment, two (or more) excitation light sources are provided on both sides of the wavelength conversion material, with an light separation structure on one side of the wavelength conversion material to separate the excitation light and the converted light based on the etendue difference of the two lights. In this embodiment, the two or more excitation lights may be the same or different colors, and the wavelength conversion material may be moving or non-moving (stationary).

Figure 1A:
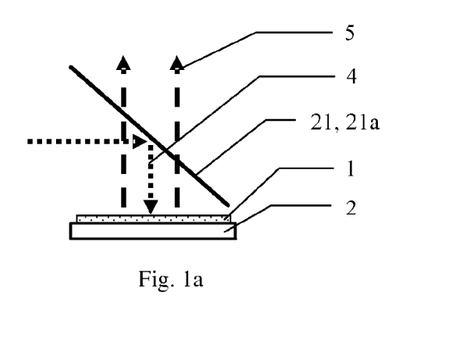
FIGS. 1a and 1b schematically depict illumination devices according to various implementations of a first embodiment of the present invention.

An illumination device according to the first embodiment of the present invention is described with reference to FIG. 1a. As shown in FIG. 1a, a wavelength conversion material 1 is formed on a light emitting surface of an LED (or an LED array) 2. The LED 2 has a light emitting semiconductor structure of several microns thick formed on a substrate, and the light emitting surface is the surface of the light emitting semiconductor structure opposite the substrate. The wavelength conversion material 1 may be directly attached to the light emitting surface of the LED, or attached to the light emitting surface of the LED by a transparent gel such as a silicone gel.

The thickness of the wavelength conversion material is preferably less than 20% of the diameter of the bounding circle of the light emitting surface of the LED (i.e. the smallest circle that contains the light emitting surface area). A thinner (relative to the size of the LED) layer of wavelength conversion material is preferable because in a thick layer, the converted light from the wavelength conversion material particles will spread inside the layer which will cause a larger light spot and reduced brightness. In addition, the wavelength conversion material layer is preferably without any encapsulation, such as silicone encapsulation typically used in LED packaging. Any encapsulation would cause an increase in etendue and a drop in brightness, because the etendue is in direct proportion to the square of refractive index, while the encapsulating materials have higher refractive index than the air.

Preferably, the LED 2 emits a blue or UV light. The wavelength conversion material 1 absorbs the light of the LED 2 (referred to as the first excitation light) and emits a converted light 5.

The wavelength conversion material 1 is a material that absorbs an excitation light and emits a converted light having a different wavelength range than the wavelength range of the excitation light. The converted light may have longer or shorter wavelength range than the excitation light (i.e. the wavelength conversion material may be up-conversion or down-conversion type). The wavelength conversion material may be a phosphor material, quantum dots, light emitting dye, or other suitable materials. To enhance the scattering and absorption of the excitation light, the wavelength conversion material may further include scattering agents, such as titanium oxide or aluminum oxide particles.

A wavelength conversion material typically emits the converted light in all directions. In the first embodiment shown in FIG. 1a, the LED 2 has a highly reflective layer between the light emitting semiconductor structure and the substrate, which serves to reflect converted light traveling toward the LED back in the other direction. The highly reflective layer also reflects the first excitation light toward the wavelength conversion material 1.

A second excitation light 4 is incident on the wavelength conversion material 1 from a side of the wavelength conversion material opposite the LED 2. Here, the side of the wavelength conversion material where the LED is located is referred to as the first side and the opposite side is referred to as the second side. The second excitation light 4 is generated by an excitation light source (not shown), which may be LEDs, semiconductor lasers, other solid state light sources, or any other suitable light sources. The second excitation light 4 and the first excitation light 3 may have the same color or different colors.

A light separation structure 21 is disposed on the second side of the wavelength conversion material 1 to separate the second excitation light 4 and the converted light 5. In the implementation shown in FIG. 1a, the second light separation element 21 is a dichroic element 21a that reflects the second excitation light 4 and passes the converted light 5, and is disposed at an angle with respect to the wavelength conversion material 1. The converted light 5 passes the dichroic element 21 and is collected by collection optics (not shown). In addition, optical elements (not shown) may be provided to shape the second excitation light 4 and delivers it to the wavelength conversion material 1.

Figure 1B:
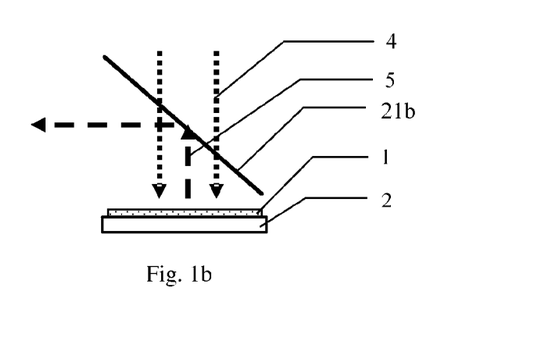

In an alternative implementation of the first embodiment, shown in FIG. 1b, the second light separate structure 21 is a dichroic element 21b that reflects the converted light 5 and passes the second excitation light 4, and is disposed at an angle with respect to the wavelength conversion material 1. The implementation shown in FIG. 1b is otherwise identical to the implementation shown in FIG. 1a. In FIGS. 1a and 1b, the dichroic elements 21a and 21b are shown as being disposed at approximately 45 degrees with respect to the surface of the wavelength conversion material 1, but other angles may also be used.

Illumination devices according to various implementations of the second and third embodiments are described with reference to FIGS. 2a-5b.

In the implementation shown in FIG. 2a, the illumination device includes a wavelength conversion material 1, a first excitation light 3 incident on the wavelength conversion material from a first side (here, below the wavelength conversion material), and a second excitation light 4 incident on the wavelength conversion material from a second side (here, above the wavelength conversion material) which is opposite the first side.

Each excitation light is generated by an excitation light source (not shown). The two excitation lights 3 and 4 may have the same color or different colors, but the double-sided configuration of FIG. 2a is particularly advantageous when the two excitation lights have the same color, as will be discussed in more detail later. In this disclosure, two excitation lights are considered to have the same color if their normalized spectra substantially overlap. The amount of overlap may be defined by the amount of spectral energy within the overlapped region of the two normalized spectra, i.e., the area of overlap between the first area which is under the first normalized spectrum curve and the second area which is under the second normalized spectrum curve. The two lights are considered to have the same color if the amount of spectral energy within the overlapped region is substantial, for example, more than 20% of the spectral energy under either one of the two spectral curves. Otherwise they may be considered to have different colors.

Figure 6A:
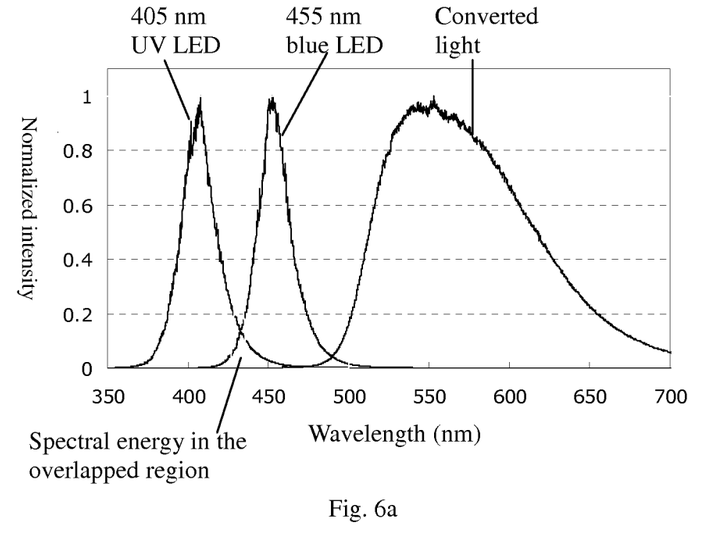
FIGS. 6a and 6b illustrate two examples of excitation lights having the same color or different colors.
Figure 6B:
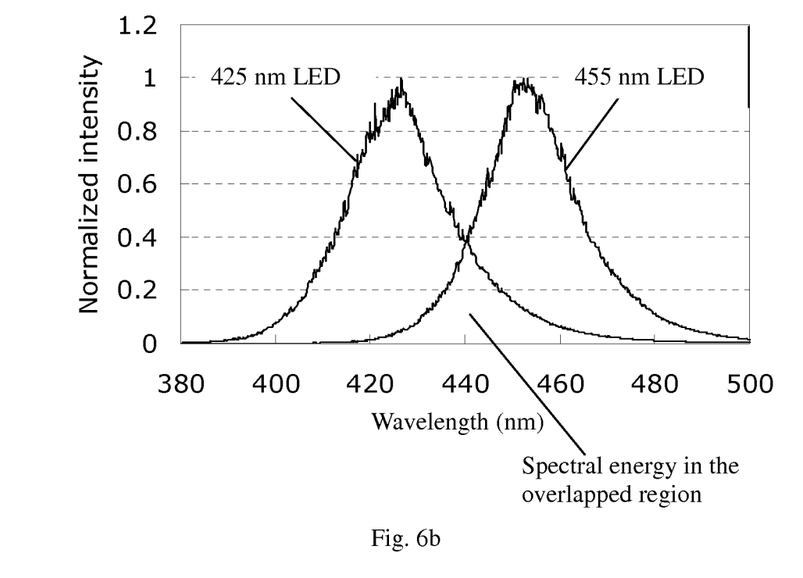

Two examples are illustrated in FIGS. 6a and 6b. FIG. 6a shows two normalized spectrum curves for a UV light centered near 405 nm and a blue light centered near 455 nm, respectively. The amount of spectral energy within the overlapped region corresponds to the small triangular area bound by the lower one of the two curves as indicated in FIG. 6a. These two lights are considered different colors as the spectra do not substantially overlap. FIG. 6b shows two normalized spectrum curves, one for a violet LED light centered near 425 nm and another for a blue LED light centered near 455 nm. These two lights may be considered to have the same color as the spectral energy in the overlapped region is substantial, even though they have different spectra. Another example of two excitation lights having the same color is two blue lights LED centered near 455 nm and 460 nm, respectively.

For typical wavelength conversion materials in wavelength conversion-based illumination devices, the following light sources may be suitable for providing the excitation light: a laser emitting a violet light in 400-410 nm, a laser emitting a blue light in 440-460 nm, an LED emitting a UV light in 380-420 nm, an LED emitting a deep blue light in 440-480 nm, etc. Typically, a laser has a narrower spectrum than an LED. Of these lights, the violate light (400-410 nm) and the UV light (380-420 nm) may be considered to have the same color, even though they have different spectra. Similarly, the blue light (440-460 nm) and the deep blue light (440-480 nm) may be considered to have the same color. On the other hand, the UV light and the blue light do not have the same color, etc.

It should be noted that the word "color" is used broadly in this disclosure; for example, UV is referred to as a color even though it is not within the visible range. In this disclosure, the term "color" is used generally to refer to a "wavelength range".

Figure 2A:
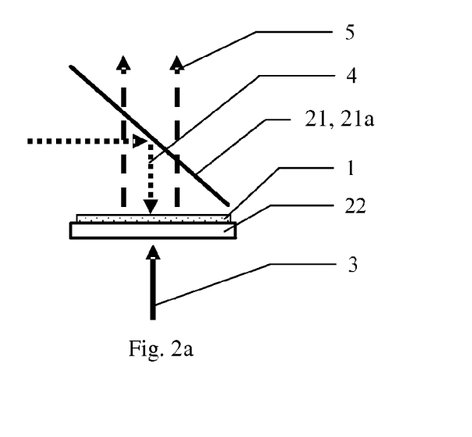
FIGS. 2a and 2b schematically depict illumination devices according to various implementations of a second embodiment of the present invention.

In the embodiment shown in FIG. 2a, the wavelength conversion material 1 is not attached to either light source. The wavelength conversion material 1 may be a formed of a substrate carrying a wavelength conversion material such as a coating or a film, a transparent binding material (a transparent gel such as silicone, or a transparent glass) mixed with a phosphor powder to form a defined shape, a transparent plastic film with phosphor powder heat-pressed onto the film, etc.

A first light separation structure 22 which reflects the converted light and passes the first excitation light 3 is disposed on the first side of the wavelength conversion material 1 parallel to the wavelength conversion material. Preferably, the wavelength conversion material 1 and the second light separation structure 22 are separated by a thin air gap which will help to reduce or eliminate undesired enlargement of the spot size of the converted light. The first excitation light 3 can pass the first light separation structure 22 to reach the wavelength conversion material, while the converted light emitted by the wavelength conversion material 1 toward the first side is reflected back toward the second side by the first light separation structure, producing an output converted light 5 from the second side of the wavelength conversion material.

The first light separation structure 22 may be a dichroic element. In the embodiment of FIG. 2a, the dichroic element 22 is disposed adjacent the wavelength conversion material 1, or in contact with the wavelength conversion material. The wavelength conversion material 1 may be coated directly on the dichroic element 22.

A second light separation structure 21 which separates the second excitation light 4 and the converted light 5 is disposed on the second side of the wavelength conversion material 1. In the embodiment shown in FIG. 2a, the second light separation structure 21 is a dichroic element 21a that reflects the second excitation light 4 and passes the converted light 5, and is disposed at an angle with respect to the wavelength conversion material 1.

In addition, optical elements (not shown) may be provided to shape the first and second excitation light 3 and 4 and to collect the converted light 5.

Figure 2B:
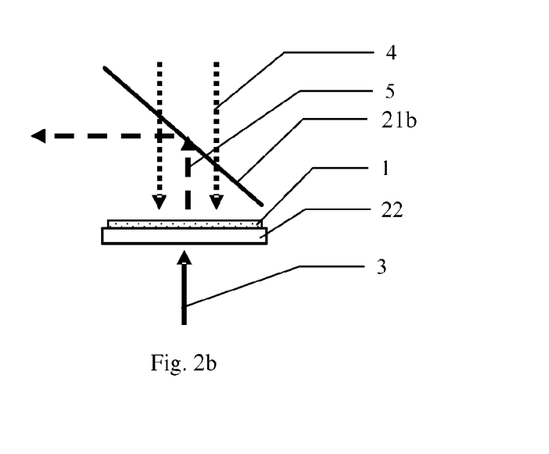

The illumination device shown in FIG. 2b is a variation of that shown in FIG. 2a. In FIG. 2b, the second light separate structure 21 is a dichroic element 21b that reflects the converted light 5 and passes the second excitation light 4. The implementation shown in FIG. 2b is otherwise identical to the implementation shown in FIG. 2a. In FIGS. 2a and 2b, the dichroic elements 21a and 21b are shown as being disposed at approximately 45 degrees with respect to the surface of the wavelength conversion material 1, but other angles may also be used.

Figure 3A:
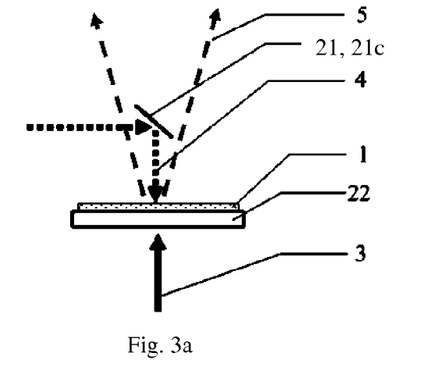
FIGS. 3a to 3c schematically depict illumination devices according to various implementations of a third embodiment of the present invention.

In another implementation shown in FIG. 3a, the illumination device includes a wavelength conversion material 1, a first excitation light 3 incident on the wavelength conversion material from a first side, a second excitation light 4 incident on the wavelength conversion material from a second side which is the opposite of the first side, a first light separation structure 22 disposed on the first side of the wavelength conversion material, and a second light separation structure 21 disposed on the second side of the wavelength conversion material to separate the second excitation 4 and the converted light 5. The two excitation lights 3 and 4 may have the same color or different colors. The structures 1 and 22 are similar to the corresponding structures in the first embodiment shown in FIGS. 2a and 2b.

Unlike the implementations of FIGS. 2a and 2b, the implementation of FIG. 3a achieves separation of the second excitation light 4 and the converted light 5 based on etendue difference of the two lights, rather than color separation (i.e. separation of two lights based on their color difference). In the embodiment shown in FIG. 3a, the second light separation structure is a small minor 21c that reflects the second excitation light 4 onto the wavelength conversion material 1. While the small mirror 21c blocks a portion of the converted light 5, the blockage causes a relatively small loss of the converted light due to the large etendue of the converted light.

Typically, the excitation lights have small divergence angles, while the converted light emitted by the wavelength conversion material 1 has a near Lambertian distribution. In other words, the wavelength conversion material 1 increases the etendue of the light after conversion. Etendue is a property of an optical system which characterizes the distribution or spread of the light in area and angle. In the devices shown in FIG. 3a, the second excitation light 4 has a relatively small etendue, but the converted light 5 generated by the wavelength conversion material 1 has a relatively large etendue due to the near Lambertian distribution. Thus, a small minor 21c can adequately deliver the excitation light 4 to the wavelength conversion material 1 while blocking only a relatively small portion of the converted light 5. In a preferred implementation, the divergence of the excitation light 4 is approximately ±10 degrees, and the small minor 21c is sized so that it sufficiently reflects all of the excitation light 4 without significant extra area. Thus, the amount of converted light (near Lambertian distribution) blocked by the small mirror is approximately)(sin 10°)$^2$≈3% of the power of the converted light. Generally, the small mirror 21c has a size such that the loss of the converted light due to the small minor is less than 40% of the power of the converted light.

In FIG. 3a, the converted light 5 is shown as being divergent as it passes around the small minor 21c. Alternatively, a focusing lens or other suitable optical elements may be provided adjacent the upper surface of the wavelength conversion material 1 to generate a near parallel beam of output converted light that has a relatively large area compared to the size of the small minor 21c.

Figure 3B:
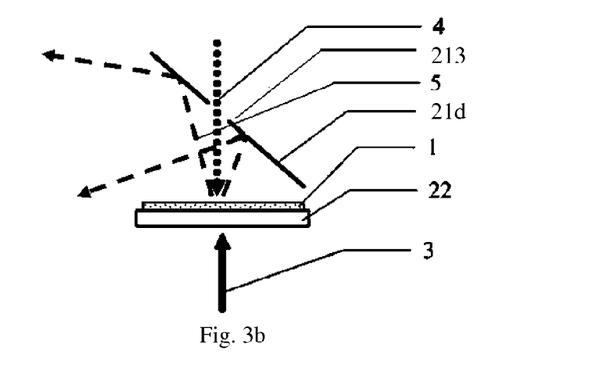

FIG. 3b shows an alternative implementation. This implementation is similar to the implementation of FIG. 3a, except that the second light separation structure is a large mirror 21d with a small hole 213. The second excitation light 4 which has a relatively small etendue is delivered to the wavelength conversion material 1 through the small hole 213, while the converted light 5 which has relatively large etendue is reflected by the large mirror 21d. Even though some converted light 5 leaks through the small hole 213 and becomes lost, the loss is small due to the small size of the hole 213. The size of the small hole 213 can be designed using similar principles discussed above regarding the size of the small mirror 21c. Generally, the small hole 213 is sized such that the loss of the converted light through the small hole is less than 40% of the power of the converted light. The implementation shown in FIG. 3b is otherwise similar to that shown in FIG. 3a.

Figure 3C:
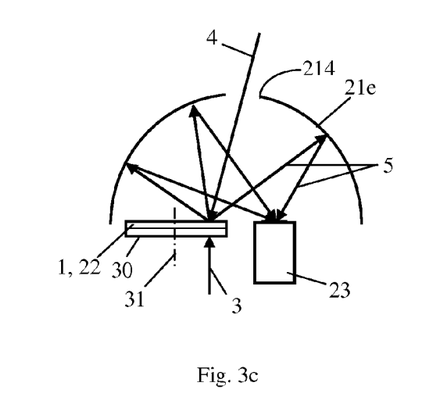

FIG. 3c shows another alternative implementation. In this implementation, the second light separation structure is a concave reflector 21e with a small hole 214. The reflector 21e has a highly reflective surface on its inside, and has an ellipsoidal or other suitable shape. The wavelength conversion material 1 (with the first light separation structure 22) is disposed at or near one focal point of the ellipsoid, and a light collection element 23 is disposed at or near another focal point of the ellipsoid. The second excitation light 4 which has a relatively small etendue is introduced onto the wavelength conversion material 1 through the small hole 214 of the reflector 21e. The converted light from the wavelength conversion material 1 which has a relatively large etendue is reflected by the reflector 21e onto the light collection element 23. Even though some converted light 5 leaks through the small hole 213 and become lost, the loss is small due to the small size of the hole 214. The size of the small hole 214 can be designed using similar principles discussed above regarding the size of the small hole 213 of the smaller mirror 21c. Generally, the small hole 214 is sized such that the loss of the converted light through the small hole is less than 40% of the power of the converted light. The first light separation structure 22 is disposed below the wavelength conversion material 1 to reflect the converted light 5 toward the reflector 21e.

The light collection element 23 may be an imaging or non-imaging optical element, such as lens array, light tunnel, solid or hollow light energy collector, etc.

The implementations shown in FIGS. 3a-3c achieve separate of the second excitation light 4 and the converted light 5 based on etendue difference of the two lights. The general principle of etendue-based light separation is described in the afore-mentioned commonly owned Chinese patent application 201010624857.2. This commonly owned application also describes other ways of implementing etendue-based light separation, which can be incorporated to implement the third embodiment of the present invention.

The light separation structures 21c, 21d and 21e shown in FIGS. 3a-3c, which achieves light separate based on etendue difference, can also be applied to the illumination devices of FIGS. 1a and 1b. For example, each of dichroic elements 21a and 21b in FIGS. 1a and 1b may be replaced by a small mirror 21c, a large minor with a hole 21d, or a curved reflector with a hole 21e shown in FIGS. 3a-3c. The locations of the excitation light source may be adjusted as appropriate.

Figure 4:
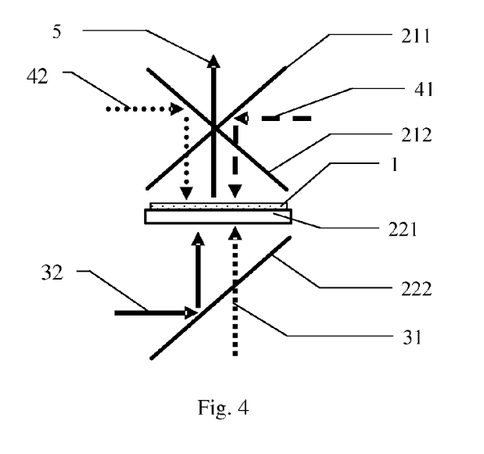
FIG. 4 schematically depict an illumination device according to another implementation of the second embodiment.

FIG. 4 shows another implementation where the excitation light on each side of the wavelength conversion material is obtained by combining light from two light sources having different wavelength ranges. In this implementation, a first dichroic element 222 which passes a first excitation light 31 and reflects a second excitation light 32 is disposed on a first side (here, below) of the wavelength conversion material 1 at an angle with respect to the wavelength conversion material. The first dichroic element 222 serves to combine the excitation lights 31 and 32 to illuminate the wavelength conversion material 1 from the first side.

A second dichroic element 211 which reflects a third excitation light 41 and passes both the converted light 5 and a fourth excitation light 42 is disposed on a second side (here, above) of the wavelength conversion material 1 at an angle with respect to the wavelength conversion material. A third dichroic element 212 which reflects the fourth excitation light 42 and passes both the converted light 5 and the third excitation light 41 is disposed on the second side of the wavelength conversion material 1 at an angle with respect to the wavelength conversion material. The dichroic elements 211 and 212, which are disposed at different angles or directions, serve to combine the two excitation lights 41 and 42 to illuminate the wavelength conversion material 1 from the second side, as well as to separate the converted light 5 from the third and fourth excitation lights 41 and 42.

In FIG. 4, the dichroic elements 211 and 212 form an X shape, which requires the second dichroic element 211 to pass the fourth excitation light 42 and requires the third dichroic element 212 to pass the third excitation light 41. In an alternative configuration, one dichroic element (for example 211) may be located above the other dichroic element (212 in this example), rather than forming an X shape. In such alternative configuration, the dichroic element on the top (211 in example) does only needs to reflect the corresponding excitation light (41 in this example) and pass the converted light 5, and does not need to pass the other excitation light (42 in this example).

In addition, a fourth dichroic element 221 which passes both excitation lights 31 and 32 and reflects the converted light is disposed adjacent and parallel to the wavelength conversion material 1, between the wavelength conversion material and the first dichroic element 222. The fourth dichroic element 221 serves to reflect the converted light back toward the second side. The converted light 5 is output on the second side through the dichroic elements 211 and 212.

Additional dichroic elements may be used to combine more than two excitation lights for delivery to the wavelength conversion material from the same side.

Note that the term "dichroic element" should be broadly understood here to include both high-pass and low-pass type as well as band-pass type and notch type devices. A dichroic element may selectively pass wavelengths above (or below) a certain wavelength and reflect all other wavelengths, selectively pass one or more ranges of wavelengths and reflect all other wavelengths, selectively reflect one or more ranges of wavelengths and pas all other wavelengths, etc.

In general, whether two or more excitation lights can be combined using dichroic elements depends on the extent to which the wavelength ranges of the lights overlap, i.e., whether they are the same color or different colors. For example, for two excitation lights, if the overlapping portion of their normalized spectra constitutes more than 20% of the spectral power of at least one of the excitation lights (i.e., they are considered to be the same color within the meaning of this disclosure), then combining them using a dichroic element may cause substantial loss. Of the various excitation lights suitable for wavelength conversion-based illumination devices mentioned earlier, the UV light (380-420 nm) and deep blue light (440-480 nm) may be combined using a dichroic element, and the blue light (440-460 nm) and violet light (400-410 nm) may be combined using another dichroic element. To the contrary, the blue light (440-460 nm) and the deep blue light (440-480 nm) cannot be combined using a dichroic element without substantial loss. Thus, if two lights of the same color are to be used as excitation lights simultaneously, it is preferable to introduce them from different sides of the wavelength conversion material 1.

For the same reason, if multiple excitation lights are to be combined to excite the wavelength conversion material from the same side, all such lights should have different colors, i.e., each light should have a different color from all other lights. In such a situation, appropriate multiple dichroic elements corresponding to the multiple lights can be used to combine the lights. More generally, the excitation light incident on one side of the wavelength conversion material may be collectively referred to as one excitation light, which may be generated by one or multiple light sources using appropriate light combining structures. The one or multiple light sources may be collectively referred to as a light source structure which may contain one or more light sources.

The structure for combining multiple excitation light described above can also be applied to the first embodiment shown in FIGS. 1a and 1b. For example, each of dichroic elements 21a and 21b in FIGS. 1a and 1b may be replaced by dichroic elements 211 and 212 of FIG. 4 to combine two excitation lights.

FIG. 6a illustrates the normalized spectra of a UV LED light (centered near 405 nm) and a blue LED light (centered near 455 nm). If these two lights are used as excitation lights 41 and 42 of FIG. 5, respectively, the following light separation structures may be used: The light separation structures 211 is a high pass dichroic element that reflects UV light (below than 430 nm) but passes blue and longer wavelength light. The light separation structure 212 is a band pass dichroic element that reflects blue light (between 430 and 480 nm) and passes lights outside that range.

To the contrary, the two lights in FIG. 6b cannot be separated using a dichroic element without substantial loss. The spectral energy in the overlapped region is approximately 30%. If the reflection/transmission transition of the dichroic element is about 440 nm, about 15% of each light will be lost. Considering the intrinsic limitation of the efficiency of the dichroic element, the actual loss of light energy will be at least 20%. In this case, placing these two excitation lights on different sides of the wavelength conversion material will eliminate the loss due to the light combination elements, and increase the brightness by about 20% as compared to a single-sided excitation configuration.

To summarize, when two excitation lights have the same color as defined under this disclosure, it is preferable to deliver the two excitation lights from different sides of the wavelength conversion material using the double-sided excitation configuration.

Figure 5A:
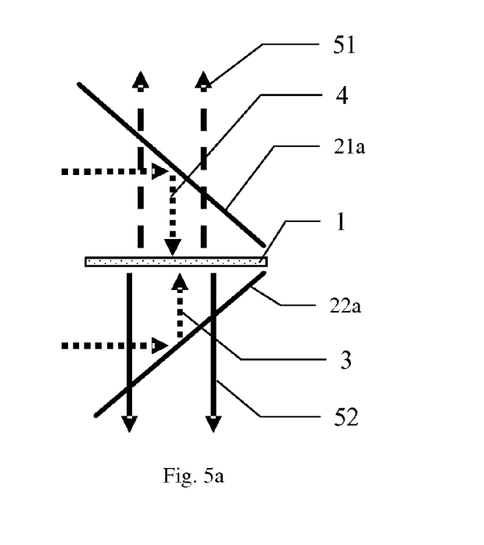
FIGS. 5a and 5b schematically depict illumination devices according to additional implementations of the second embodiment.
Figure 5B:
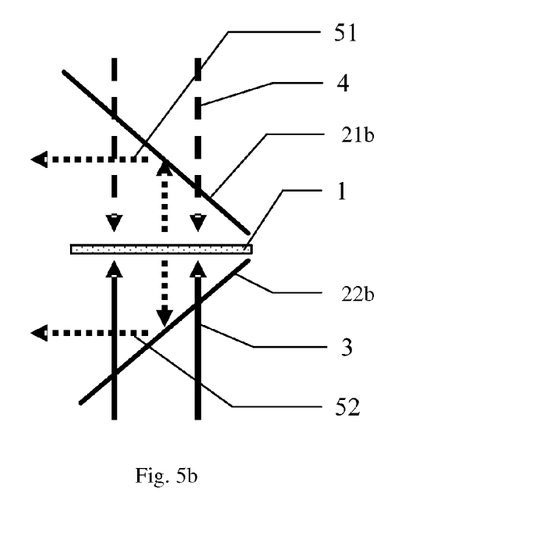

FIGS. 5a and 5b illustrate additional implementations in which the converted light is outputted from both sides of the wavelength conversion material 1. As shown in FIG. 5a, the wavelength conversion material 1 is illuminated by first and second excitation lights 3 and 4 from the first and second sides, respectively. Unlike the implementations shown in FIGS. 2a and 2b, a first light separation structure 22 is not disposed parallel to the wavelength conversion material 1. Rather, in FIG. 5a, the first light separation element, which is a dichroic element 22a that reflects the first excitation light 3 and passes the converted light, is disposed at an angle with respect to the wavelength conversion material 1. Thus, a first converted light 52 is output from the first side (i.e. the bottom surface) of the wavelength conversion material 1.

On the second side, the second light separation element is a dichroic element 21a which reflects the second excitation light 4 and passes the converted light, and which is disposed at an angle with respect to the wavelength conversion material 1. Thus, a second converted light 51 is output from the second side (i.e. the top surface). The two converted lights 51 and 52 may be collected and combined by collection optics (not shown) to form a combined output light.

The implementation shown in FIG. 5b is similar to that of FIG. 5a, except that the first light separation element is a dichroic element 22b that passes the first excitation light 3 and reflects the converted light 52, and the second light separation element is a dichroic element 21b which passes the second excitation light 4 and reflects the converted light 51. The two converted lights 51 and 52 may be collected and combined by collection optics (not shown) to form a combined output light.

The implementations shown in FIGS. 3a and 3b may also be modified to obtain an illumination device that outputs the converted light from both sides of the wavelength conversion material. To accomplish this, the first light separation element 22 is eliminated, and the small minor 21c or the large minor 21d with small hole 213 is duplicated at the first side (i.e. below the wavelength conversion material 1). The implementation shown in FIG. 4 may likewise be modified to obtain output converted light from both sides, and the detailed explanation is omitted here.

In various implementations described above, by using light separation structures of different characteristics, the direction of the output converted light may be changed. This is the case for the implementation of FIG. 1a vs. FIG. 1b, FIG. 2a vs. FIG. 2b, FIG. 3a vs. FIG. 3b, and FIG. 5a vs. FIG. 5b.

In the various implementations shown in FIGS. 2a-5b, the wavelength conversion material 1 may be a free-standing element, e.g., a transparent substrate carrying a phosphor material. The substrate may be, for example, aluminum oxide, aluminum nitride, sapphire, or glass. Alternatively, in the case of FIGS. 2a-4, the wavelength conversion material 1 may be formed on the surface of the dichroic element 22. The substrate or the dichroic element 22 provides a good heat sink for the wavelength conversion material to enhance heat dissipation, which allows for increased power output.

In the various implementations shown in FIGS. 2a-5b, the wavelength conversion material may be mounted on a transparent moving plate that can move (rotation or a linear oscillation) with respect to the light sources. The moving plate may carry one wavelength conversion material; alternatively, it may be divided into multiple segments carrying multiple different wavelength conversion materials to provide multi-colored lights. A moving plate 30 which rotates around an axis 31 is shown in FIG. 3c. Here, the moving plate 30 is show as carrying both the wavelength conversion material 1 and the dichroic element 22. Alternatively, the dichroic element my by separate from the moving plate. Although not shown in FIGS. 2a-3b, 4 and 5a-5b, a moving plate can be similarly implemented for these implementations. Additional ways of implementing a moving plate are described in U.S. Pat. No. 7,547,114.

It will be apparent to those skilled in the art that various modification and variations can be made in the wavelength conversion-based illumination device of the present invention without departing from the spirit or scope of the invention. Thus, it is intended that the present invention cover modifications and variations that come within the scope of the appended claims and their equivalents.

What is claimed is:

1. An illumination device comprising:
a first excitation light source generating a first excitation light, the first excitation light source having a light emitting surface from which the first excitation light exits;
a wavelength conversion material formed on the light emitting surface of the first excitation light source;
a second excitation light source structure generating a second excitation light incident on the wavelength conversion material from a second side which is opposite the first excitation light source;
wherein the wavelength conversion material absorbs the first and second excitation lights and generates a converted light having different wavelengths than the first and second excitation lights;
wherein the first excitation light source has a highly reflective layer on a surface opposite the light emitting surface which reflects the first excitation light and the converted light; and
a light separation structure disposed between the wavelength conversion material and the second excitation light source structure to separate the converted light and the second excitation light.

2. The illumination device of claim 1, wherein the light separation structure separates the second excitation light and the converted light based on a color difference between the second excitation light and the converted light.

3. The illumination device of claim 2, wherein the light separation structure is a dichroic element that reflects the second excitation light and passes the converted light, or a dichroic element that passes the second excitation light and reflects the converted light.

4. The illumination device of claim 1, wherein the second excitation light is generated by combining a plurality of lights using a light combination structure.

5. The illumination device of claim 1, wherein the light separation structure separates the converted light and the second excitation light based on an etendue difference between the converted light and the second excitation light.

6. The illumination device of claim 1, wherein the first excitation light source is a light emitting diode or a light emitting diode array.

7. The illumination device of claim 1, wherein the wavelength conversion material is directly attached to the light emitting surface, or attached to the light emitting surface by a transparent gel.

8. The illumination device of claim 1, wherein the wavelength conversion material is without any encapsulation.

9. The illumination device of claim 1, wherein the wavelength conversion material has a thickness which is less than 20% of a lateral dimension of the light emitting surface.

10. An illumination device comprising:
a wavelength conversion material;
a first excitation light source structure generating a first excitation light incident on the wavelength conversion material from a first side;
a second excitation light source structure generating a second excitation light incident on the wavelength conversion material from a second side, wherein the first and second excitation lights have the same color;
wherein the wavelength conversion material absorbs the first and second excitation lights and generates a converted light having different wavelengths than the first and second excitation lights;
a first light separation structure disposed on the first side of the wavelength conversion material to separate the converted light and the first excitation light; and
a second light separation structure disposed on the second side of the wavelength conversion material to separate the converted light and the second excitation light.

11. The illumination device of claim 10, wherein the second light separation structure separates the second excitation light and the converted light based on a color difference between the second excitation light and the converted light.

12. The illumination device of claim 11, wherein the second light separation structure is a dichroic element that reflects the second excitation light and passes the converted light, or a dichroic element that passes the second excitation light and reflects the converted light.

13. The illumination device of claim 10, wherein the second light separation structure separates the converted light and the second excitation light based on an etendue difference between the converted light and the second excitation light.

14. The illumination device of claim 13, wherein the second light separation structure is a small minor that reflects the second excitation light while allowing the converted light to pass around it.

15. The illumination device of claim 13, wherein the second light separation structure is a mirror with a small hole which reflects the converted light while allowing the second excitation light to pass through the small hole.

16. The illumination device of claim 13, wherein the second light separation structure is a curved reflector with a small hole, wherein the wavelength conversion material is disposed at a first focal point of the reflector, wherein the illumination device further including a light collection element disposed at a second focal point of the reflector, wherein the reflector reflects the converted light to the light collection device while allowing the second excitation light to pass through the small hole.

17. The illumination device of claim 10, wherein the first light separation structure is a dichroic element that reflects the second excitation light and passes the converted light, or a dichroic element that passes the second excitation light and reflects the converted light.

18. The illumination device of claim 10, wherein the first light separation structure is a dichroic element that that passes the second excitation light and reflects the converted light, and wherein the dichroic element is disposed adjacent and parallel to the wavelength conversion material.

19. The illumination device of claim 10, wherein the first excitation light is generated by combining a plurality of lights using a light combination structure.

20. The illumination device of claim 10, wherein the second excitation light is generated by combining a plurality of lights using a light combination structure.

21. The illumination device of claim 10, further comprising a transparent moving plate capable of moving with respect to the excitation lights, wherein the wavelength conversion material is disposed on the moving plate.

22. An illumination device comprising:
a wavelength conversion material;
a first excitation light source structure generating a first excitation light incident on the wavelength conversion material from a first side;
a second excitation light source structure generating a second excitation light incident on the wavelength conversion material from a second side;
wherein the wavelength conversion material absorbs the first and second excitation lights and generates a converted light having different wavelengths than the first and second excitation lights;
a first light separation structure disposed on the first side of the wavelength conversion material to separate the converted light and the first excitation light; and
a second light separation structure disposed on the second side of the wavelength conversion material to separate the converted light and the second excitation light based on an etendue difference between the converted light and the second excitation light.

23. The illumination device of claim 22, wherein the second light separation structure is a small minor that reflects the second excitation light while allowing the converted light to pass around it.

24. The illumination device of claim 22, wherein the second light separation structure is a mirror with a small hole which reflects the converted light while allowing the second excitation light to pass through the small hole.

25. The illumination device of claim 22, wherein the second light separation structure is a curved reflector with a small hole, wherein the wavelength conversion material is disposed at a first focal point of the reflector, wherein the illumination device further including a light collection element disposed at a second focal point of the reflector, wherein the reflector reflects the converted light to the light collection device while allowing the second excitation light to pass through the small hole.

26. The illumination device of claim 22, wherein the first light separation structure is a dichroic element that reflects the second excitation light and passes the converted light, or a dichroic element that passes the second excitation light and reflects the converted light.

27. The illumination device of claim 22, wherein the first light separation structure is a dichroic element that that passes the second excitation light and reflects the converted light, and wherein the dichroic element is disposed adjacent and parallel to the wavelength conversion material.

28. The illumination device of claim 22, wherein the first excitation light is generated by combining a plurality of lights using a light combination structure.

29. The illumination device of claim 22, further comprising a transparent moving plate capable of moving with respect to the excitation lights, wherein the wavelength conversion material is disposed on the moving plate.

* * * * *